United States Patent
Ko

(10) Patent No.: US 11,184,199 B2
(45) Date of Patent: Nov. 23, 2021

(54) ELECTRONIC APPARATUS

(71) Applicant: Samsung Electronics Co., Ltd., Suwon-si (KR)

(72) Inventor: Baekseok Ko, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/095,157

(22) Filed: Nov. 11, 2020

(65) Prior Publication Data
US 2021/0144032 A1 May 13, 2021

(30) Foreign Application Priority Data
Nov. 12, 2019 (KR) .................. 10-2019-0144012

(51) Int. Cl.
*H04L 25/03* (2006.01)
*H04B 1/12* (2006.01)

(52) U.S. Cl.
CPC ....... *H04L 25/03885* (2013.01); *H04B 1/123* (2013.01); *H04L 25/03057* (2013.01)

(58) Field of Classification Search
CPC . H04B 1/123; H04B 1/38; H04B 1/40; H04B 3/04; H04B 3/06; H04B 3/14; H04B 3/143; H04B 3/54; H04B 3/548; H04L 25/0264; H04L 25/03006; H04L 25/03019; H04L 25/03057; H04L 25/03878; H04L 25/03885; H04L 2025/03433

USPC ....... 375/219, 220, 229, 232, 257, 346, 348; 333/28 R; 708/322, 323
See application file for complete search history.

(56) References Cited

U.S. PATENT DOCUMENTS

| | | | |
|---|---|---|---|
| 5,963,110 A | 10/1999 | Ihara et al. | |
| 7,599,431 B1 * | 10/2009 | Anderson | H04L 25/03038 375/229 |
| 2013/0249612 A1 * | 9/2013 | Zerbe | G11C 7/222 327/161 |
| 2014/0009227 A1 * | 1/2014 | Kay | H03F 3/3022 330/127 |
| 2020/0387264 A1 * | 12/2020 | Van Ostrand | G06F 3/0393 |

OTHER PUBLICATIONS

Abishek Manian, et al., "A 32-GB/s 9.3-mW CMOS Equalizer with 0.73-V Supply", CICC, 2014, 4 pages.
J. Craninckx, et al., "A 1,8-GHz CMOS Low-Phase-Noise Voltage-Controlled Oscillator with Prescaler", IEEE Journal of Solid-State Circuits, vol. 30, No. 12, Dec. 1995, pp. 1474-1482.
(Continued)

*Primary Examiner* — Young T. Tse
(74) *Attorney, Agent, or Firm* — Staas & Halsey, LLP

(57) ABSTRACT

Disclosed is an electronic apparatus including: a substrate; and an integrated circuit (IC) and an inductor provided in the substrate, the IC including: a plurality of subcircuits; and an equalizer configured to receive a signal from an outside of the IC, compensate the received signal for distortion or interference, and output the compensated signal to the subcircuit, and the inductor of which: a first end is connected to a power and a second end is connected to a power supplying terminal of the equalizer, and an inductance corresponds to an operation frequency of the equalizer.

20 Claims, 10 Drawing Sheets

(56) References Cited

OTHER PUBLICATIONS

Sudip Shekhar, et al., "Bandwidth Extension Techniques for CMOS Amplifiers", IEEE Journal of Solid-State Circuits, vol. 41, No. 11, Nov. 2006, pp. 2424-2439.
Srikanth Gondi, et al., "Equalization and Clock and Data Recovery Techniques for 10-GB/s CMOS Serial-Link Receivers", IEEE Journal of Solid-State Circuits, vol. 42, No. 9, Sep. 2007, pp. 1999-2011.

* cited by examiner

ELECTRONIC APPARATUS

CROSS-REFERENCE TO RELATED THE APPLICATION

This application is based on and claims priority under 35 U.S.C. § 119 to Korean Patent Application No. 10-2019-0144012, filed on Nov. 12, 2019 in the Korean Intellectual Property Office, the disclosure of which is incorporated by reference herein in its entirety.

BACKGROUND

Field

The disclosure relates to an electronic apparatus with an equalizer for compensating a signal received from the outside.

Description of Related Art

An equalizer is used to compensate a signal for distortion, attenuation or the like that occurs in a process of transmitting the signal through a predetermined channel.

For example, to remove interference caused by the channel, a continuous time linear equalizer (CTLE) may be configured as a part of a chip, i.e. an integrated chip (IC) for an analog front-end module in a channel receiver.

Such an analog front-end module of the receiver including the equalizer may be provided with an on-chip type of inductor to amplify a signal of a predetermined frequency band.

With a trend of miniaturization and high-performance in an electronic apparatus, so-called high-frequency analog device parts have been tried to be mounted together with a circuit on a silicon chip. However, an inductor among the foregoing devices occupies a considerably large area of the silicon chip, and therefore there is a waste of an IC die area when the on-chip type of inductor is provided.

Further, when an IC is designed to have the on-chip type of inductor, a regulator or decoupling devices are additionally used for power separation because of concern about digital noise due to common power. However, the regulator or the decoupling devices cause a chip size to be increased, and thus the concern about the wasteful silicon chip area may become more serious.

SUMMARY

According to an aspect of an embodiment, provided is an electronic apparatus including: a substrate; and an integrated circuit (IC) and an inductor provided in the substrate, the IC including: a plurality of subcircuits; and an equalizer configured to receive a signal from an outside of the IC, compensate the received signal for distortion or interference, and output the compensated signal to the subcircuit, and the inductor of which: a first end is connected to a power and a second end is connected to a power supplying terminal of the equalizer, and an inductance corresponds to an operation frequency of the equalizer.

The second end of the inductor and the equalizer may be connected by a bonding wire.

The inductance of the inductor and second inductance of the bonding wire may correspond to the operation frequency of the equalizer, and the bonding wire may include at least one of length, thickness, height, angle or material corresponding to the second inductance.

The second end of the inductor and the equalizer may be connected by a flip chip.

The electronic apparatus may further include a capacitor connected in parallel with the first end of the inductor with respect to the power, and the inductance of the inductor and capacitance of the capacitor may correspond to the operation frequency of the equalizer.

The plurality of subcircuits of the IC may be connected to a second power different from the power.

The equalizer may be configured to amplify a signal of a frequency band corresponding to the operation frequency.

The equalizer may include a continuous time linear equalizer (CTLE).

The signal may include a serial communication signal.

The serial communication signal may include a signal based on at least one of a high definition multimedia interface (HDMI) or a universal serial bus (USB).

The electronic apparatus may further include a second inductor of which a first end is connected to the power through the equalizer and a second end is connected to a ground.

The electronic apparatus may further include a display configured to display an image.

According to another aspect of an embodiment, provided is an electronic apparatus including: a substrate; and an integrated circuit (IC) and an inductor provided in the substrate, the IC including: a plurality of subcircuits; and an equalizer configured to receive a signal from an outside of the IC, compensate the received signal for distortion or interference, and output the compensated signal to the subcircuit, and the inductor of which: a first end is connected to a power through the equalizer and a second end is connected to a ground, and an inductance corresponds to an operation frequency of the equalizer.

The first end of the inductor and the equalizer may be connected by a bonding wire, the inductance of the inductor and second inductance of the bonding wire may correspond to the operation frequency of the equalizer, and the bonding wire may include at least one of length, thickness, height, angle or material corresponding to the second inductance.

The first end of the inductor and the equalizer may be connected by a flip chip.

The electronic apparatus may further include a capacitor connected in parallel with the second end of the inductor with respect to the ground, and the inductance of the inductor and capacitance of the capacitor may correspond to the operation frequency of the equalizer.

The plurality of subcircuits of the IC may be connected to a second ground different from the ground.

The equalizer may be configured to amplify a signal of a frequency band corresponding to the operation frequency.

The equalizer may include a continuous time linear equalizer (CTLE).

The signal may include a serial communication signal based on at least one of a high definition multimedia interface (HDMI) or a universal serial bus (USB).

BRIEF DESCRIPTION OF THE DRAWINGS

The above and/or the aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
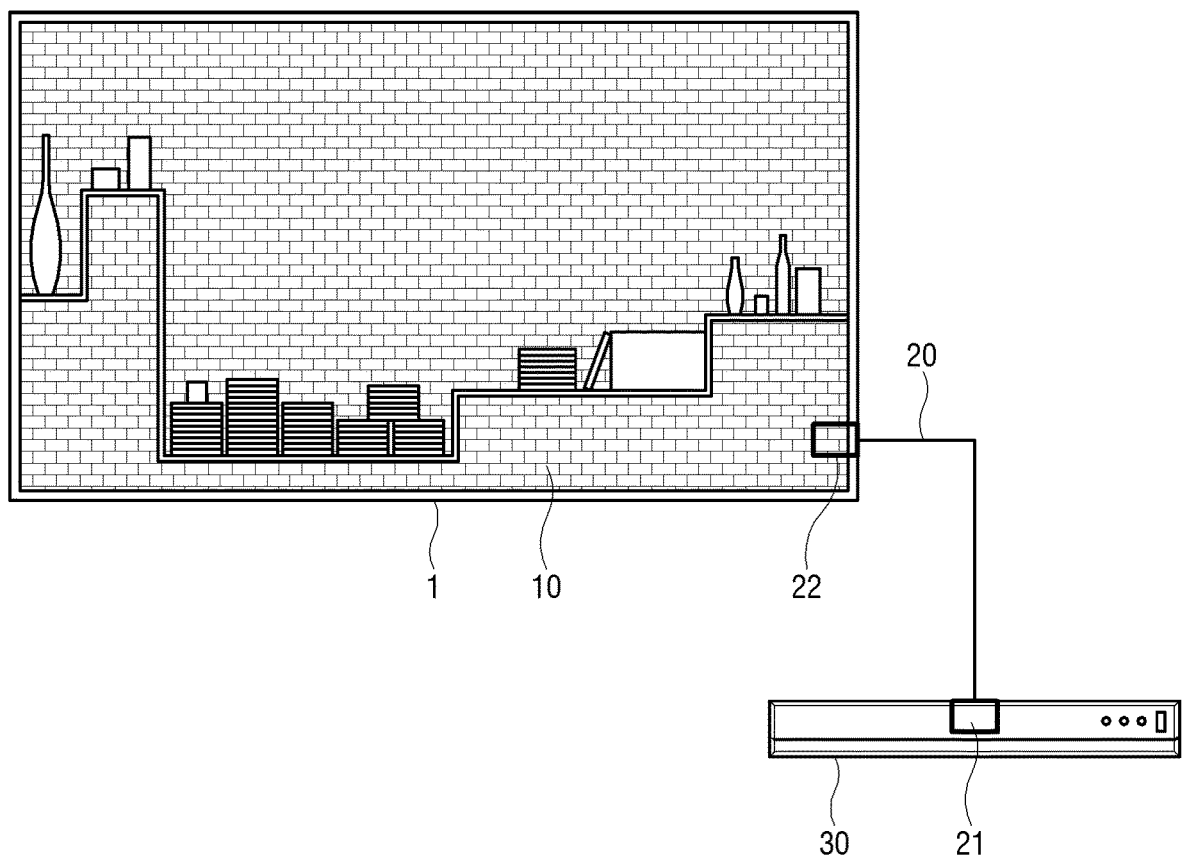
FIG. 1 illustrates an example that an electronic apparatus according to an embodiment of the disclosure is installed.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is determined that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

An aspect of the disclosure is to provide an electronic apparatus including an off-chip inductor to reduce a chip size by improving power noise characteristics in an integrated chip (IC) and eliminating a waste of an IC die area, while maintaining functions of an equalizer.

Another aspect of the disclosure is to provide an electronic apparatus including an off-chip inductor, which is applicable regardless of silicon stacking structures and methods and semiconductor packaging methods, and in which inductance is easily adjustable in an off-chip area.

Figure 2:
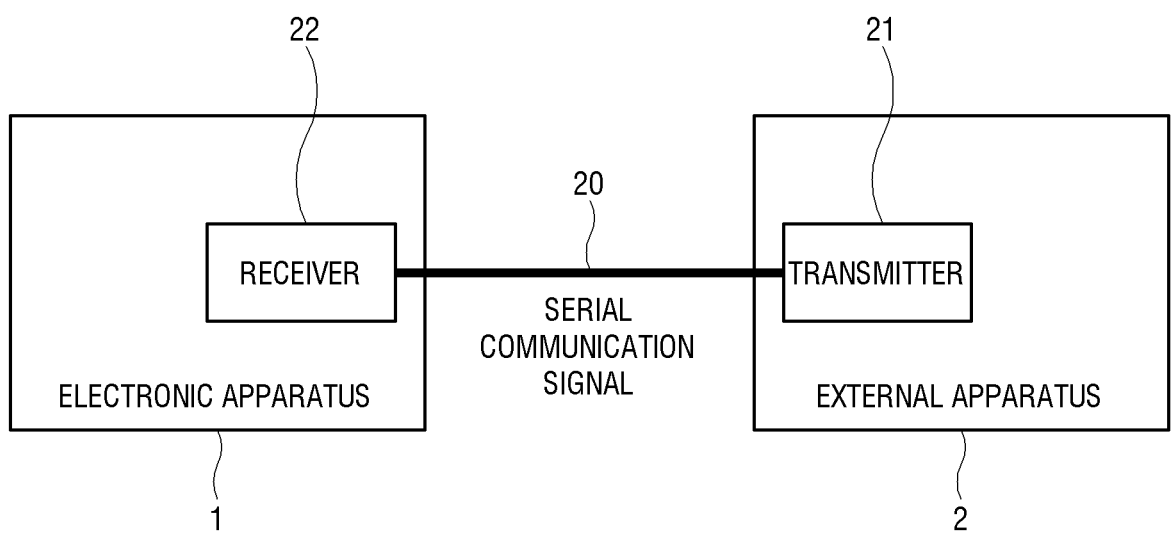
FIG. 2 illustrates an example that a signal is transmitted and received based on connection between an electronic apparatus according to an embodiment of the disclosure and an external apparatus.

FIG. 1 illustrates an example that an electronic apparatus according to an embodiment of the disclosure is installed, and FIG. 2 illustrates an example that a signal is transmitted and received based on connection between an electronic apparatus according to an embodiment of the disclosure and an external apparatus.

According to an embodiment, an electronic apparatus 1 may be embodied by a display apparatus installed in, for example, a wall or the like, and including a display 10 for displaying an image thereon.

As shown in FIG. 1, the electronic apparatus 1 may connect with an external apparatus 2 capable of outputting a signal corresponding to an image to be displayed on the display 10.

The external apparatus 2 is provided to output a signal for displaying an image based on content received from an external image or signal source or stored therein.

According to an embodiment, the electronic apparatus 1 and the external apparatus 2 may, as shown in FIG. 1, be connected/accessed to each other by a cable 20. The electronic apparatus 1 may receive data such as audio/video signals and a control signal from the external apparatus 2 through the cable 20.

According to an embodiment, the external apparatus 2 and the electronic apparatus 1 may be embodied to transmit and receive a serial communication signal to and from each other.

The serial communication signal includes a signal based on a typical wired communication method of a high-speed serial communication signal, typified by a serializer/deserializer (SERDES). The serial communication signal may include a signal based on at least one of general-purpose communication methods, for example, a high definition multimedia interface (HDMI) or a universal serial bus (USB). Alternatively, the serial communication signal may include a signal based on at least one of image information communication methods, for example, a unified standard interface for TV (USI-T) or a mobile industry processor interface (MIPI).

The external apparatus 2 and the electronic apparatus 1 may respectively include a transmitter 21 and a receiver 22, as shown in FIG. 2, to transmit and receive a signal to and from each other. A signal output from the transmitter 21 of the external apparatus 2 is transmitted to the receiver 22 through the cable 20, so that the electronic apparatus 1 can receive the signal.

According to an embodiment, the transmitter 21 may be embodied by a serial transmitter (Tx) that transmits a serial communication signal through a channel, and the receiver 22 may be embodied by a serial receiver (Rx) that receives the serial communication signal through the channel.

The transmitter 21 and the receiver 22 may for example be embodied as circuitry including a data input/output interface where communication modules (e.g. a S/W module, a chip, etc.), ports, and the like corresponding to predetermined communication protocols such as an HDMI or a USB are combined.

However, the communication method between the electronic apparatus 1 and the external apparatus 2 is not limited to the HDMI or USB, but may use interfaces based on various protocols.

According to an embodiment, the cable 20 may be embodied by an optical cable, into which a data cable and a power cable are integrated, for example, an HDMI optical cable or a USB optical cable. The optical cable employs an optical fiber, which includes a core and a clad, to transmit and receive information, and therefore each of the transmitter 21 and the receiver 22 includes a signal converter for conversion between an electric signal and an optical signal.

According to an embodiment, the cable 20 for connection between the electronic apparatus 1 and the external apparatus 2 may be embodied by an invisible cable (hereinafter, also referred to as a magic cable), so as not to spoil beauty even through the electronic apparatus 1 and the external apparatus 2 are installed as connected to each other.

However, according to an embodiment of the disclosure, a means for connecting the electronic apparatus 1 and the external apparatus 2 is not limited to the cable 20, but may be connected to each other by various methods.

According to an embodiment, the external apparatus 2 may include a so-called media box provided as an auxiliary or appended apparatus that outputs a signal to the electronic apparatus 1 so that the electronic apparatus 1 can display images based on various pieces of content. The external apparatus 2 may, for example, be also called a one connect (OC) box because it is connected to the electronic apparatus 1 by the invisible cable or the like single cable 20.

According to an embodiment of the disclosure, the transmitter 21 of the external apparatus 2 and the receiver 22 of the electronic apparatus 1 may transmit and receive a high-frequency signal to and from each other through the cable 20.

According to an embodiment, the receiver 22 of the electronic apparatus 1 may include an equalizer to compensate a signal for distortion, attenuation, etc. that may occur while transmitting the high-frequency signal.

According to the disclosure, the configuration of the receiver 22 including the equalizer will be defined as an analog front-end (AFE) module.

Below, embodiments will be described focusing on the analog front-end module provided in the receiver 22 that receives the high-frequency signal through the cable 20, like a receiver Rx of a wired communication transceiver, a receiver analog front-end of an optical transceiver, etc., but there are no limits to the applicability of the disclosure. In other words, the analog front-end of the disclosure may be applied to not only the receivers of the HDMI, the USB and the like the external interface, but also receivers of internal interfaces for signal transmission between internal devices of the apparatus. For example, such a manner that the off-chip inductor is connected the power or ground of a receiver of a double data rate (DDR) interface or a clock embedded interface may also belong to the disclosure.

Figure 3:
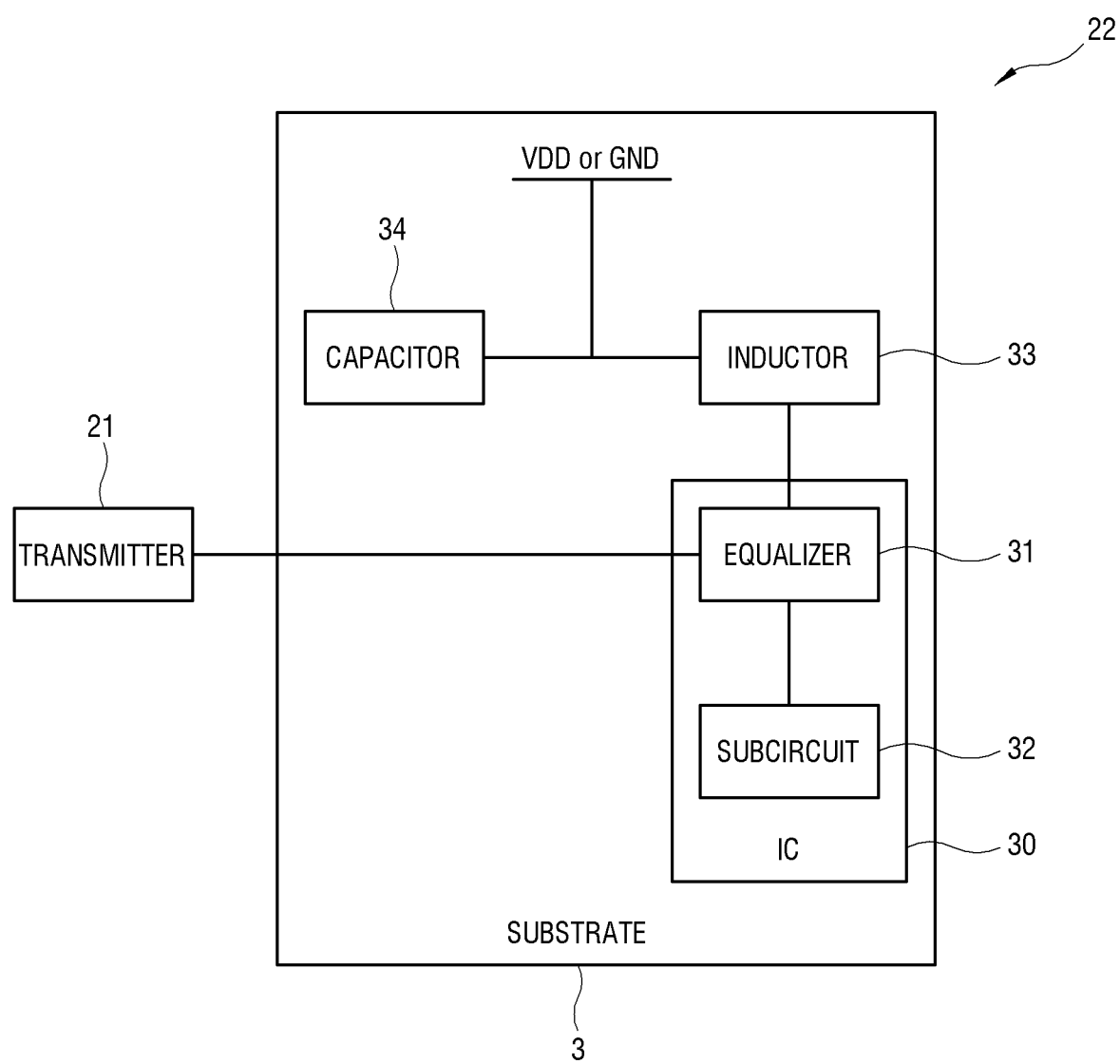
FIG. 3 is a block diagram of an analog front-end module in an electronic apparatus according to an embodiment of the disclosure.
Figure 4:
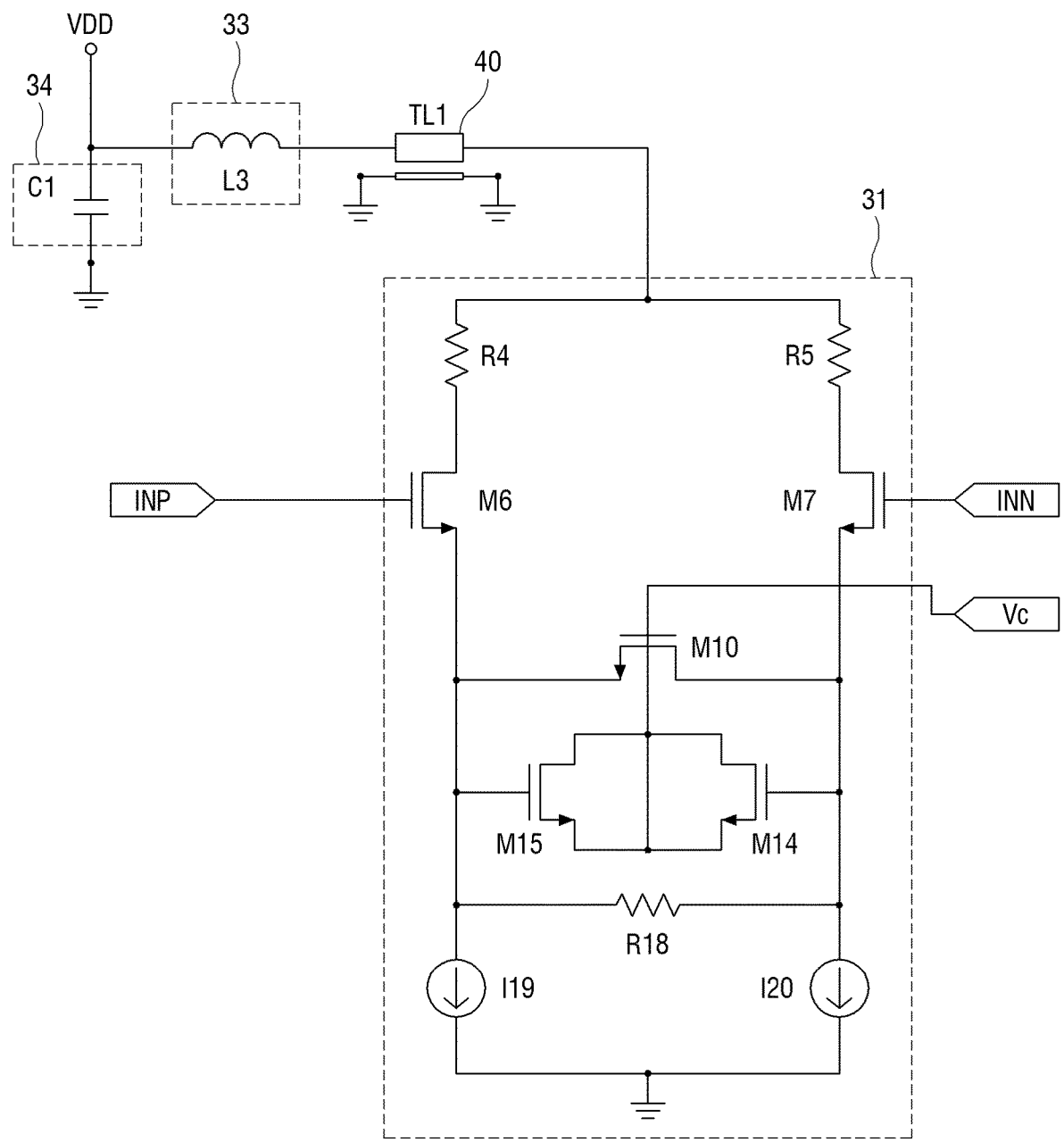
FIG. 4 is a circuit diagram of an analog front-end module in an electronic apparatus according to an embodiment of the disclosure.

FIG. 3 is a block diagram of an analog front-end module in an electronic apparatus according to an embodiment of the disclosure, and FIG. 4 is a circuit diagram of an analog front-end module in an electronic apparatus according to an embodiment of the disclosure.

According to an embodiment of the disclosure, the receiver 22, i.e. the analog front-end module of the electronic apparatus may, as shown in FIG. 3, include an equalizer 31 that compensates a signal for distortion or interference, and a subcircuit 32 that receives the signal output from the equalizer 31. Here, the equalizer 31 may for example be a continuous time linear equalizer (CTLE).

According to an embodiment, the equalizer 31 and the subcircuit 32 may, as shown in FIG. 3, be included in an integrated circuit (IC) 30. In other words, the equalizer 31 may receive a signal from the outside of the IC 30, compensate the received signal for distortion or interference, and output the compensated signal to the subcircuit 32.

According to an embodiment, the subcircuit 32 may be among a plurality of subcircuits, which are configured to perform operations as the analog front-end module based on the signal received from the equalizer 31, and there are no limits to the type and number of subcircuits 32.

The IC 30 may, for example, be embodied in the form of a system on chip (SoC) where the equalizer 31, the subcircuit 32 and the like parts are arranged on a silicon chip.

The IC 30 may be embodied as mounted to a substrate 3, for example, a printed circuit board (PCB) or a package substrate installed in the PCB. The substrate 3 may include a power plane for supplying power to the IC 30 and the like parts mounted thereon, and a ground plane corresponding to the power plane.

The substrate 3 may, as shown in FIG. 3, further include an inductor 33 provided as a component of the analog front-end module.

According to an embodiment, the analog front-end module of the receiver 22 maybe designed in such a manner that the inductor 33 has first end connected to power VDD or the ground GND and the second end connected to the equalizer 31 as shown in FIG. 3.

According to an embodiment, the inductor 33 may be provided as an off-chip inductor component placed outside the IC 30. Therefore, the equalizer 31 may receive a signal from the outside of the IC 30, compensate the received signal for distortion or interference, and output the compensated signal to the subcircuit 32. The equalizer 31 may receive the signal from the outside of the IC 30 through a cable connector or PCB transmission line.

The substrate 3 may, as shown in FIG. 3, further include a capacitor 34 provided as the component of the analog front-end module.

According to an embodiment, the analog front-end module of the receiver 22 may be designed in such a manner that first end of the capacitor 34 is connected to the power VDD or the ground GND in parallel with the first end or the second end of the inductor 33 as shown in FIG. 3.

FIG. 4 illustrates a circuit diagram by way of example according to an embodiment of the disclosure when first end of the inductor 33 L3 is connected to the power VDD and first end of the capacitor 34 C1 is connected to the power VDD in parallel with the first end of the inductor 33. Alternatively, first end of the inductor 33 may be connected to the ground GND, and first end of the capacitor 34 is connected to the ground GND in parallel with the first end of the inductor 33.

The inductor 33 L3 may be set to have inductance corresponding to an operation frequency of the equalizer 31, thereby amplifying a signal of a predetermined frequency band and outputting the amplified signal to the equalizer 31. In other words, the component time constant set as the operation frequency of the inductor 33 may correspond to a use frequency of a channel signal of the equalizer 31, for example, a Nyquist frequency characteristic.

The capacitor 34 C1 may be set to have capacitance corresponding to the operation frequency of the equalizer 31.

The capacitor 34 C1 serves to reduce noise coming from a power supply of a system, and separate the equalizer 31 from additional inductance of a power delivery network not managed as connected to first end of the inductor 33 L3.

In other words, the capacitor 34 C1 is connected to the first end of the inductor 33 L3, and reduces noise that occurs in the power terminal of the substrate 3 or the cable 20, i.e. noise of a power delivery Network (PDN). Here, the capacitor 34 C1 separates the equalizer 31 from a parasitic inductance (i.e. additional inductance) of the PDN connected to the first end of the inductor 33 L3, thereby designing and managing the inductance for inductive peaking of the equalizer 31.

According to an embodiment, as shown in FIG. 4, the inductor 33 L3, of which the first end is connected to the power, and the second end is connected to a power supplying terminal of the equalizer 31, is embodied in the form of an off chip to achieve inductive peaking for bandwidth enhancement.

Here, the second end of the inductor 33 L3 may, as shown in FIG. 4, be connected to the equalizer 31 through an interconnection 40 TL1.

According to an embodiment, the second end of the inductor 33 L3 and the equalizer 31 may be connected by a bonding wire, and the interconnection 40 may for example include one or more wires.

According to another embodiment, the second end of the inductor 33 L3 and the equalizer 31 may be connected by a flip chip type, and the interconnection 40 may for example include an adhesive material such as solder, conductive glue, etc.

In the foregoing embodiments, the inductor 33 L3 may be placed on the substrate 3, for example, the PCB outside the IC 30, so that the second end of the inductor 33 L3 and the equalizer 31 can be connected by an IC overall packaging process. Further, according to the disclosure, a connection structure for the substrate 3, the IC 30, the inductor 33 L3, etc. may be achieved by various silicon stacking structures/methods such as a 3D IC, an interposer, etc.

However, the method of connecting the inductor 33 L3 and the equalizer 31 according to the disclosure is not limited to those of the foregoing embodiments, and thus various materials or methods may be applied to the interconnection 40.

Figure 5:
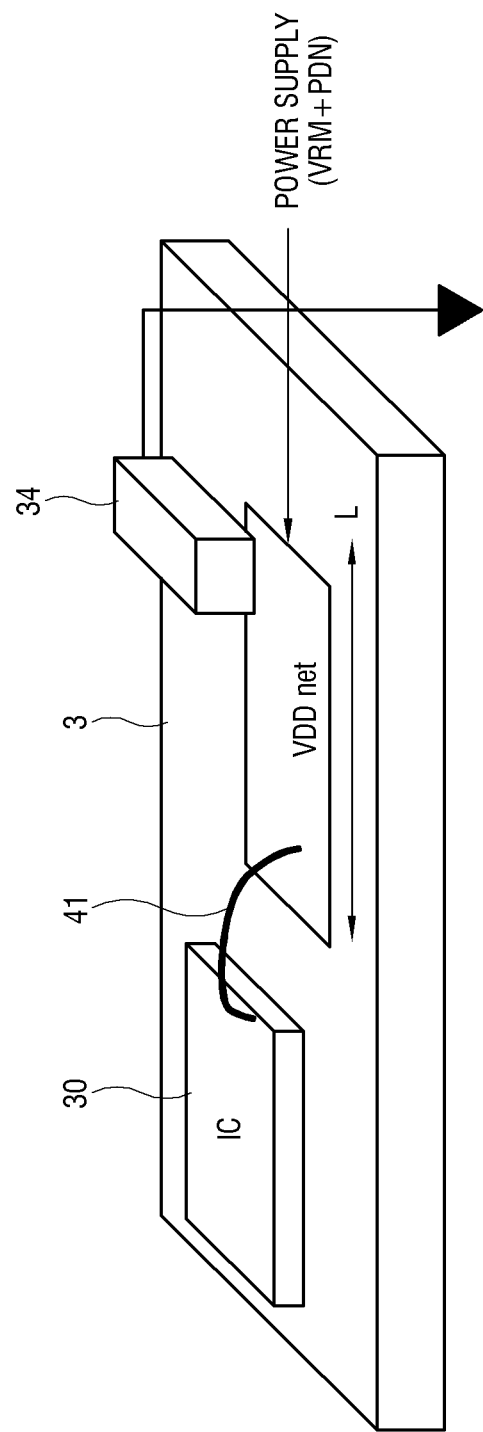
FIG. 5 is a view for explaining inductance provided by an off-chip inductor in an electronic apparatus according to an embodiment of the disclosure.
Figure 6:
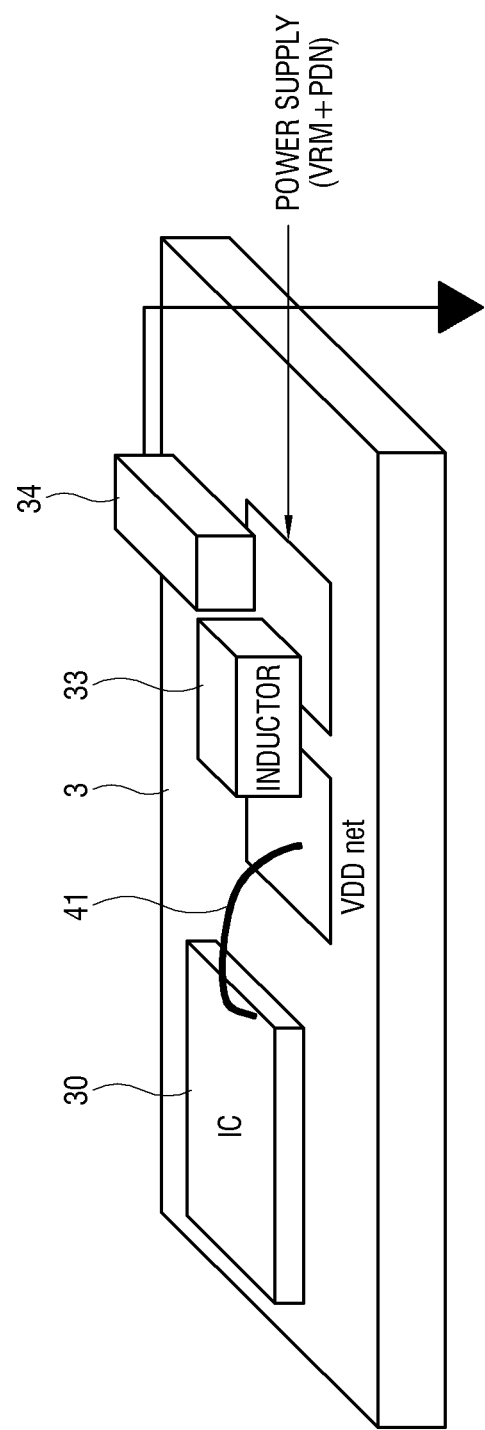
FIG. 6 is a view for explaining inductance provided by an off-chip inductor in an electronic apparatus according to an embodiment of the disclosure.

FIGS. 5 and 6 are views for explaining inductance provided by an off-chip inductor in an electronic apparatus according to an embodiment of the disclosure.

In the electronic apparatus 1 according to an embodiment of the disclosure, the analog front-end module may generate inductance by separating at least one of the internal power VDD or the ground GND and connecting the inductor 33 to the at least one of the separated power VDD or ground GND. Here, the inductor 33 may be embodied by a surface mount technology (SMT) off-chip inductor mounted onto the substrate 3.

According to an embodiment, the inductor 33 may include a winding-type inductor.

FIGS. 5 and 6 illustrate that the analog front-end module is configured to connect the inductor 33 to the power VDD by a bonding wire 41, by way of example, in which the connection length, height, angle, thickness, material, etc. of the bonding wire 41 may be varied.

As shown in FIGS. 5 and 6, the IC 30 including the equalizer 31 and the subcircuit 32 may be mounted to a die on the substrate 3. Here, the IC 30 is configured not to include the inductor, and it is thus possible to reduce the die area in the substrate 3 as much as occupied by the IC 30 as compared with that of when an IC includes an on-chip inductor.

According to an embodiment, the wire 41 having a predetermined length may, as shown in FIG. 5, include a first end bonded to the IC 30, and a second end bonded to a VDD network configured to be connected to the power plane of the substrate 3. Here, the first end of the wire 41 may be bonded to the IC 30 so as to be electrically connected to the equalizer 31.

The capacitor 34 for decoupling may, as shown in FIG. 5, be inserted corresponding to the length L of the VDD network connected to the power plane of the substrate 3. Here, the capacitor 34 may be mounted onto the substrate 3 as connected to the power through the VDD network with the second end connected to the ground.

Further, as shown in FIG. 6, the inductor 33 is added as connected to the power plane of the substrate 3 through the VDD network.

According to an embodiment, inductance (hereinafter, referred to as first inductance) of the inductor 33 and inductance (hereinafter, referred to as second inductance) of the bonding wire 41 may correspond to the operation frequency of the equalizer 31.

Here, the bonding wire 41 has the second inductance varied depending on at least one of its length, thickness, height, angle or material, and the first inductance of the inductor 33 may be set by taking the second inductance of the bonding wire 41 into account, so that the first inductance and the second inductance can correspond to the operation frequency of the equalizer 31.

As described above, the analog front-end according to an embodiment is embodied to include the inductor 33 having inductance, and it is thus possible to use the wire 41 having a relatively short length.

According to an embodiment, the inductor 33 may be configured to allow its inductance, i.e. time constant to be set (or adjusted and/or debugged) by adjusting a tuning parameter. In the foregoing embodiment of the disclosure, the off-chip inductor 33 is provided to thereby enhance a degree of freedom in tuning the inductance.

Meanwhile, according to another embodiment, the bonding wire 41 shown in FIGS. 5 and 6 may be replaced by the interconnection 40 using a flip chip to connect the IC.

As described above, when the analog front-end module is configured to connect the off-chip inductor 33 to the power or ground, the IC 30 may additionally include at least one of a power pin or a ground pin.

Figure 7:
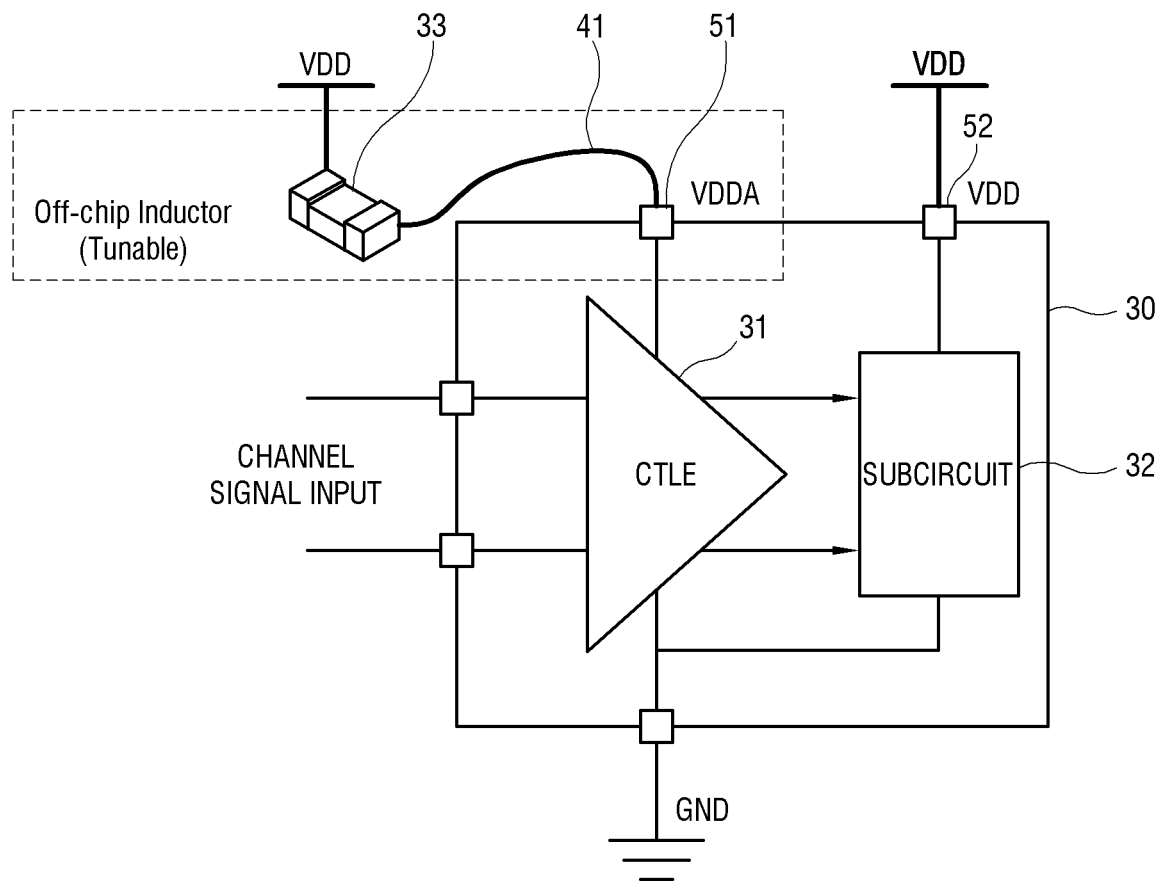
FIG. 7 is a view for explaining structures and operations of an analog front-end module including an off-chip inductor in an electronic apparatus according to embodiments of the disclosure.
Figure 8:
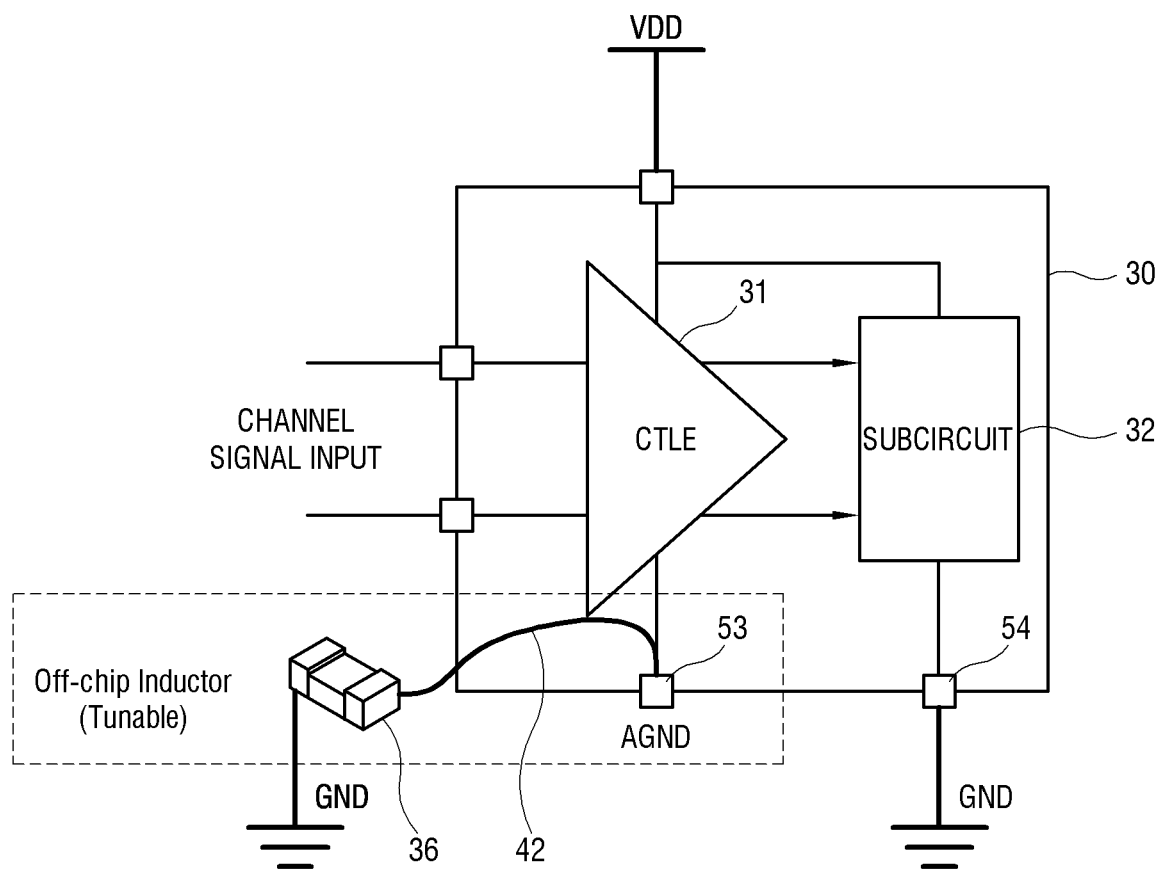
FIG. 8 is a view for explaining structures and operations of an analog front-end module including an off-chip inductor in an electronic apparatus according to embodiments of the disclosure.
Figure 9:
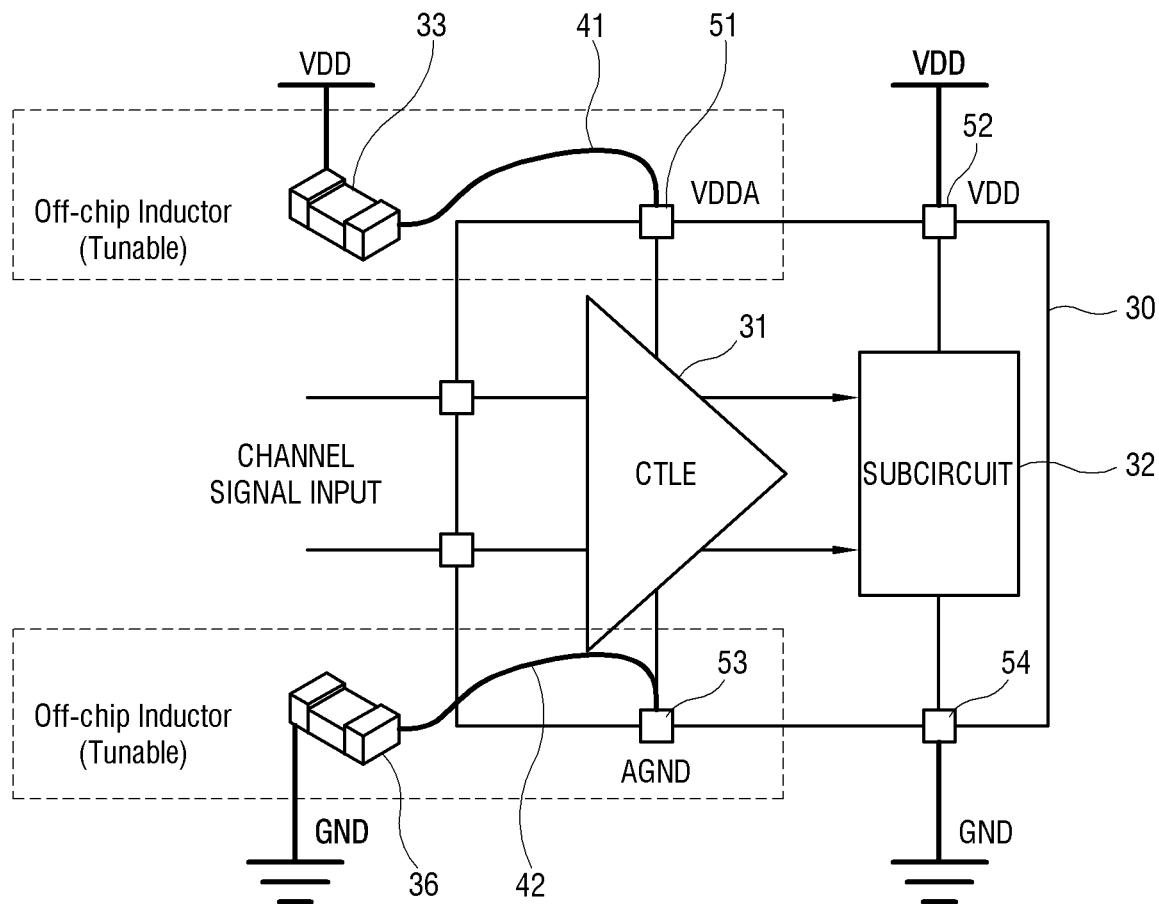
FIG. 9 is a view for explaining structures and operations of an analog front-end module including an off-chip inductor in an electronic apparatus according to embodiments of the disclosure.

FIGS. 7 to 9 are views for explaining structures and operations of an analog front-end module including an off-chip inductor in an electronic apparatus according to embodiments of the disclosure, in which FIG. 7 shows that the inductor is connected to the power, FIG. 8 shows that the inductor is connected to the ground, and FIG. 9 shows that two inductors are respectively connected to the power and the ground.

The electronic apparatus 1 according to an embodiment may, as shown in FIG. 7, include an off-chip inductor 33, of which the first end is connected to the power VDD and the second end is connected to a power supplying terminal VDDA of the equalizer 31, outside the IC 30 including the equalizer 31, i.e. the CTLE and the subcircuit 32. Here, the second end of the inductor 33 may be connected to a power pin 51 of the IC 30 provided to supply power for the equalizer 31 by the interconnection 40, for example, by the bonding wire 41.

The equalizer 31 may, as shown in FIG. 7, receive a channel input signal, for example, a serial communication signal based on the HDMI, the USB, etc. from the outside, and output an equalized signal, which is obtained by compensating the received signal for distortion or interference, to the subcircuit 32.

Here, the equalizer 31 may amplify a signal of an operation frequency band and output the amplified signal, and the first inductance of the inductor 33 and the second inductance of the bonding wire 41 may be set to correspond to the operation frequency of the equalizer 31. In other words, the inductor 33 is embodied with the inductance tunable in the off-chip area.

Although it is not illustrated in FIG. 7, the electronic apparatus 1 according to an embodiment may further include a capacitor connected in parallel with the first end of the inductor 33 with respect to the power VDD, in which the inductance of the inductor 33 and the capacitance of the capacitor may correspond to the operation frequency of the equalizer 31.

The subcircuit 32 is connected to a second power different from the power to which the first end of the inductor 33 is connected. To this end, as shown in FIG. 7, the IC 30 may further include a power pin 52 to receive second power VDD.

According to an embodiment shown in FIG. 7, VDD refers to power separated from VDDA in the chip, i.e. the IC 30, which is provided to supply power to the subcircuit 32 and the like components of the IC 30, and it is therefore possible to prevent interference between the first power supplied to the equalizer 31 through the inductor 33 and the second power supplied to the subcircuit 32.

In the foregoing analog front-end module according to an embodiment, only one power pin 52 is added to the IC 30 so that the inductor 33 can be connected as the off-chip component to the power VDD of the equalizer 31, thereby having effects on not only performing signal equalizing through the equalizer 31, but also improving a tolerance as an analog block for communication is separated from power noise in the SoC.

Meanwhile, the electronic apparatus 1 according to another embodiment may, as shown in FIG. 8, include an off-chip inductor 36, of which the first end is connected to the power VDD through the equalizer 31 and the second end is connected to the ground GND, outside the IC 30 including the equalizer 31, i.e. the CTLE and the subcircuit 32. Here, the second end of the inductor 36 may be connected to a power pin 51 of the IC 30 provided to supply power for the equalizer 31 by the interconnection 40, for example, by a bonding wire 42. Here, the second end of the inductor 36 may be connected to a ground pin 53 of the equalizer 31 by the interconnection 40, e.g. the bonding wire 42.

The equalizer 31 may, as shown in FIG. 8, receive a channel input signal, for example, a serial communication signal based on the HDMI, the USB, etc. from the outside, and output an equalized signal, which is obtained by compensating the received signal for distortion or interference, to the subcircuit 32.

Here, the equalizer 31 may amplify a signal of an operation frequency band and output the amplified signal, and third inductance of the inductor 36 and the fourth inductance of the bonding wire 42 may be set to correspond to the operation frequency of the equalizer 31. In other words, the inductor 36 is embodied with the inductance tunable in the off-chip area.

Although it is not illustrated in FIG. 8, the electronic apparatus 1 according to this embodiment may further include a capacitor connected in parallel with the second end of the inductor 36 with respect to the ground GND, in which the inductance of the inductor 36 and the capacitance of the capacitor may correspond to the operation frequency of the equalizer 31.

The subcircuit 32 is connected to a second ground different from the ground to which the first end of the inductor 36 is connected. To this end, as shown in FIG. 8, the IC 30 may further include a ground pin 54 for the second ground.

In the foregoing analog front-end module according to this embodiment, only one ground pin 54 is added to the IC 30 so that the inductor 36 can be connected as the off-chip component to the ground GND of the equalizer 31, thereby having effects on not only performing signal equalizing through the equalizer 31, but also improving a tolerance as an analog block for communication is separated from power noise in the SoC.

Meanwhile, the electronic apparatus 1 according to still another embodiment may, as shown in FIG. 9, include a first off-chip inductor 33, of which the first end is connected to the power VDD and the second end is connected to the power supplying terminal VDDA of the equalizer 31, and a second off-chip inductor 36, of which the first end is connected to the power VDD through the equalizer 31 and the second end is connected to the ground GND, outside the IC 30 including the equalizer 31, i.e. the CTLE and the subcircuit 32. Here, the second end of the first inductor 33 may be connected to the power pin 51 of the IC 30 provided to supply power for the equalizer 31 by the interconnection 40, for example, by the bonding wire 41, and the second end of the second inductor 36 may be connected to the ground pin 53 of the equalizer 31 by the interconnection 40, for example, by the bonding wire 41.

The equalizer 31 may, as shown in FIG. 9, receive a channel input signal, for example, a serial communication signal based on the HDMI, the USB, etc. from the outside, and output an equalized signal, which is obtained by compensating the received signal for distortion or interference, to the subcircuit 32.

Here, the equalizer 31 may amplify a signal of an operation frequency band and output the amplified signal, and the first inductance of the first inductor 33 and the second inductance of the bonding wire 41, and the third inductance of the second inductor 36 and the fourth inductance of the bonding wire 42 may be set to correspond to the operation frequency of the equalizer 31. In other words, the inductance of the first and second inductors 33 and 36 is tunable in the off-chip area.

Although it is not illustrated in FIG. 9, the electronic apparatus 1 according to this embodiment may further include a first capacitor connected in parallel with the first end of the first inductor 33 with respect to the power VDD, and a second capacitor connected in parallel with the second end of the second inductor 36 with respect to the ground GND, in which the inductance of the first inductor 33, the capacitance of the first capacitor, the inductance of the second inductor 36, and the capacitance of the second capacitor may correspond to the operation frequency of the equalizer 31.

The subcircuit 32 is connected to a second power different from the power to which the first end of the first inductor 33 is connected, and connected to a second ground different from the ground to which the first end of the second inductor 36 is connected. To this end, as shown in FIG. 9, the IC 30 may further include the power pin 52 to receive second power, and the ground pin 54 for the second ground.

In the foregoing analog front-end module according to this embodiment, only one power pin 52 and only one ground pin 54 are added to the IC 30 so that the inductor 33 can be connected as the off-chip component to the power VDD of the equalizer 31, thereby having effects on not only performing signal equalizing through the equalizer 31, but also improving a tolerance as an analog block for communication is separated from power noise in the SoC.

Below, other elements of the electronic apparatus according to an embodiment of the disclosure an embodiment will be described with reference to the accompanying drawing.

Figure 10:
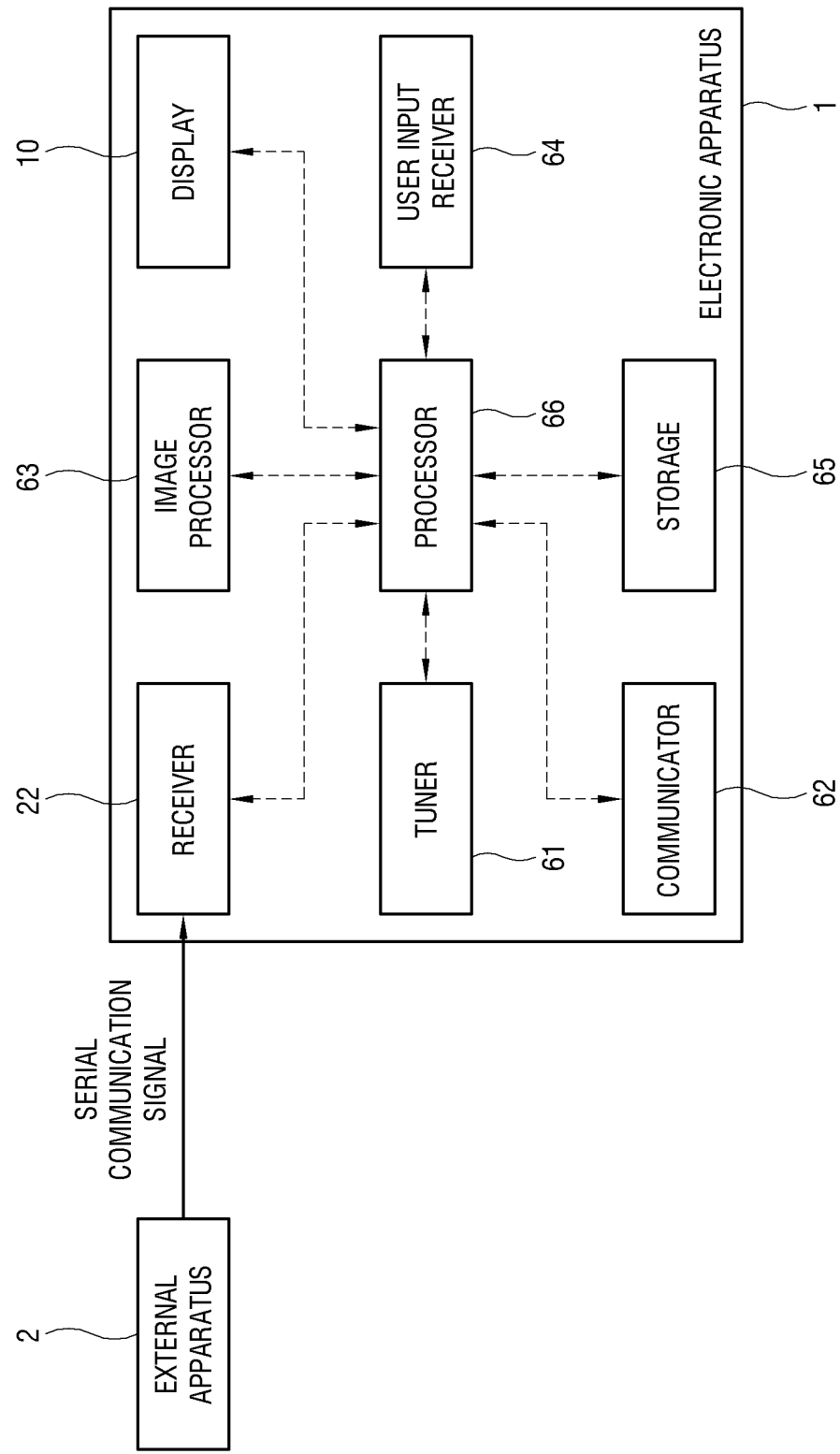
FIG. 10 is a block diagram of an electronic apparatus according to an embodiment of the disclosure.

FIG. 10 is a block diagram of an electronic apparatus according to an embodiment of the disclosure.

According to an embodiment, the electronic apparatus 1 is embodied by a television (TV) that displays broadcast content. However, there are no limits to the embodiment of the electronic apparatus 1 according to the disclosure, and thus any apparatus capable of receiving the serial communication signal may belong to the electronic apparatus 1 according to the disclosure The electronic apparatus 1 may receive content from various image sources such as the external apparatus 2.

According to the disclosure, there are no limits to the kinds of image sources for providing content to the electronic apparatus 1. For example, a set-top box (STB), a personal computer (PC) such as a desktop or laptop computer, a player for an optical disc such as Blu-ray disc or digital versatile disc (DVD), a mobile device including a smart pad such as a smartphone or a tablet computer, etc. Further, the electronic apparatus 1 may receive content provided in the form of a real-time streaming file through a wired or wireless network.

When the electronic apparatus 1 is embodied as the TV, the electronic apparatus 1 may receive and process broadcast content based on at least one of a broadcast signal, broadcast information or broadcast data from a transmitter of a broadcasting station. The electronic apparatus 1 may wirelessly receive a RF signal, i.e. a broadcast signal from the broadcasting station. To this end, the display apparatus 1 may include an antenna configured to receive a broadcast signal, and a tuner 52 configured to be tuned to a channel corresponding to a broadcast signal.

In the electronic apparatus 1, the broadcast signal may be received through a terrestrial wave, a cable, a satellite, etc., and a signal source is not limited to the broadcasting station. That is, any apparatus or station capable of transmitting and receiving data may be included in the image source according to the disclosure.

According to an embodiment, the electronic apparatus 1 may operate as a smart TV or an Internet protocol (IP) TV. The smart TV refers to a TV that can receive and display a broadcast signal in real time, support a web browsing function so that various pieces of content can be searched and consumed through the Internet while a broadcast signal is displayed in real time, and provide a convenient user environment for the web browsing function. Further, the smart TV includes an open software platform to provide an interactive service to a user. Therefore, the smart TV is capable of providing various pieces of content, for example, an application for a predetermined service to a user through the open software platform. Such an application refers to an application program for providing various kinds of services, for example, a social network service (SNS), finance, news, weather, a map, music, a movie, a game, an electronic book, etc.

Standards for a signal received in the electronic apparatus 1 may be variously configured corresponding to the types of the apparatus, and image content may for example be received based on a high definition multimedia interface (HDMI), composite video, component video, super video, Syndicat des Constructeurs d'Appareils Radiorécepteurs et Téléviseurs (SCART), USB, a display port (DP), etc. by a wire.

Further, the electronic apparatus 1 may receive image content from various apparatuses such as a server through wireless communication. There are no limits to the wireless communication, and the electronic apparatus 1 may perform at least one of wireless communication based on an access point (AP) or wireless communication for direct connection with other devices without the AP. For example, the electronic apparatus 1 may receive content from image sources through wireless communication based on Wi-Fi, Wi-Fi direct, Bluetooth, etc.

The wired interface may for example include a cable based on predetermined standards. The wireless interface may for example be based on at least one of Wi-Fi, Wi-Fi direct, or Bluetooth.

According to an embodiment the electronic apparatus 1 may be configured to receive the serial communication signal based on HIDMI, USB, etc. from the external apparatus 2, but the source apparatus from which the electronic apparatus 1 according to the disclosure receives a signal is not limited to the external apparatus 2s.

According to an embodiment of the disclosure, the electronic apparatus 1 may, as shown in FIG. 10, include a receiver 22, an image processor 63, a tuner 61, a communicator 62, a user input receiver 64, a storage 65 and a processor 66. However, the elements included in the electronic apparatus 1 are not limited to those according to this embodiment, but may exclude or change some elements or additionally include some elements.

The receiver 22 allows the electronic apparatus 1 to connect with various apparatuses such as the external apparatus 2 through the cable 20. As described above, the receiver 22 may receive the serial communication signal from the transmitter 21 of the external apparatus 2.

The tuner 61 may be tuned to the channels corresponding to the broadcast signals. The tuner 61 may include a demodulator that demodulates a broadcast signal of a certain tuned channel and outputs a signal in the form of a transport stream (TS). In other words, the tuner and the demodulator may be designed as a single integrated chip, or may be respectively designed as separated two chips.

The communicator 62 performs wired or wireless communication with at least one apparatus including an image source. The electronic apparatus 1 may receive content from the image source through the communicator 62.

The communicator 62 may be embodied by a communication circuitry including wired or wireless communication modules (e.g. an S/W module, a chip, etc.) corresponding to various kinds of communication protocols.

According to an embodiment, the communicator 62 includes a wireless local area network (WLAN) unit. The WLAN unit may be wirelessly connected to other apparatuses through an access point (AP) under control of the processor 66. The WLAN unit includes a Wi-Fi communication module.

According to an embodiment, the communicator 62 includes a short-range communication module that support wireless direct communication between the electronic apparatus 1 and other apparatuses without the access point (AP). The short-range communicate module may employ at least one of Wi-Fi Direct, Bluetooth, Bluetooth low energy, RF communication, infrared data association (IrDA), Zigbee, ultrawideband (UWB), and near field communication (NFC).

When the electronic apparatus 1 performs direct communication with the external apparatus, the storage 65 may be configured to store address information (e.g. media access control (MAC) address or Internet protocol (IP) address) about the external apparatus with which the communication will be performed.

In the electronic apparatus 1 according to an embodiment of the disclosure, the communicator 62 is configured to perform wireless communication with the external apparatus by at least one of the WLAN unit and the short-range communication module according to its performance.

According to an alternative embodiment, the communicator 62 may include Ethernet and the like wired communication module.

According to an embodiment, the electronic apparatus 1 may receive video content from an external sever or the like image source through the communicator 62 by a real-time steaming method. For example, the electronic apparatus 1 may receive content from Netflix, YouTube or the like service by the streaming method.

The image processor 63 performs various preset video/audio processes with regard to an image signal. The image processor 63 outputs an image signal generated or combined by performing such processes to the display 10, so that an image based on the image signal can be displayed on the display 10. The image signal processed in the image processor 63 may be based on data stored in a flash memory, a hard disk drive (HDD), or the like nonvolatile storage 65.

The image processor 63 includes a video decoder for decoding an image signal to have an image format of the electronic apparatus 1, and a scaler for adjusting the image signal to correspond to the output standards of a display panel.

According to an embodiment, the decoder may for example be embodied by an H.264 decoder, but not limited thereto. In other words, the video decoder in this embodiment may for example be embodied by a moving picture experts group (MPEG) decoder, a high efficiency video codec (HEVC) decoder, or the like decoders corresponding to various compression standards.

Further, there are no limits to the kinds of content to be processed by the image processor 63 according to the disclosure. For example, the content to be processed by the image processor 63 may include not only a moving picture like a video, but also a still picture such as a picture of joint photographic experts group (JPEG) file, a background image, etc.

The content to be processed by the image processor 63 may include content data corresponding to a displayed image and meta data as appended data of the content data according to its kinds.

Here, there are no limits to the kinds of video processing process performed in the image processor 63. For example, the image processor 63 may for example perform at least one of various processes such as de-interlacing for converting an interlaced broadcast signal into a progressive broadcast signal, detail enhancement, frame refresh rate conversion, line scanning, etc.

The image processor 63 may be embodied by a group of individual components for independently performing processes to process an image signal, or a main system-on-chip (SoC) where various functions are integrated. The main SoC may further include at least one application processor, a microprocessor or a CPU embodied as an example of the processor 66 (to be described later).

According to an embodiment, the image processor 63 may be embodied by a video board including circuit elements such as various chipsets for performing respective processes, a memory, electronic parts, wirings, etc. which are mounted on to a printed circuit board (PCB). In this case, the image processor 63 and the processor 66 of the electronic apparatus 1 may be provided on a single video board. Of course, this is merely an example, and they may be arranged on a plurality of PCBs connecting and communicating with each other.

The signal processed by the image processor 63 is output to the display 10.

The display 10 displays an image based on the signal received from the image processor 63.

There are no limits to the types of the display 10, and the display 10 may be embodied by various display types such as liquid crystal, plasma, a light-emitting diode, an organic light-emitting diode, a surface-conduction electron-emitter, a carbon nano-tube, nano-crystal, etc. The display 10 may include additional elements, for example, a driver according to its types.

The user input receiver 64 transmits various preset control commands or unrestricted information to the processor 66 in response to a user input.

According to an embodiment of the disclosure, the electronic apparatus 1 may allow the display 10 to display an image of predetermined content, based on a channel selected by a user input made through the user input receiver 64.

The user input receiver 64 includes a keypad (or an input panel) including a power key, a numeral key, a menu key or the like buttons provided in the electronic apparatus 1.

According to an embodiment, the user input receiver 64 includes an input device that generates a command/data/information/signal previously set to remotely control the electronic apparatus 1 and transmits it to the electronic apparatus 1. The input device may include a remote controller, a keyboard, a mouse, etc. and receive a user input as separated from the electronic apparatus 1. The remote controller may include a touch sensor for receiving a user's touch input and/or a motion sensor for detecting its own motion caused by a user. The input device includes a terminal such as a smartphone in which a remote-control application is installed. In this case, the input device can receive a user's touch input through the touch screen.

The input device may perform wireless communication with the main body of the electronic apparatus 1, and the wireless communication may be based on Bluetooth, IrDA, RF communication, WLAN, or Wi-Fi direct.

According to an embodiment, the user input receiver 64 may further include a voice input receiver that receives a voice/sound uttered by a user. The voice input receiver may be embodied by a microphone that receives a user voice.

The storage 65 may be configured to store various pieces of data of the electronic apparatus 1. The storage 65 may be embodied by a nonvolatile memory (or a writable read only memory (ROM)) which can retain data even though the electronic apparatus 1 is powered off, and mirror changes. That is, the storage 65 may include one among a flash memory, an HDD, an erasable programmable ROM (EPROM) or an electrically erasable programmable ROM (EEPROM). The storage 65 may further include a volatile memory such as a dynamic random access memory (DRAM) or a static random access memory (SRAM)s, of which reading or writing speed for the electronic apparatus 1 is faster than that of the nonvolatile memory.

Data stored in the storage 65 may for example include not only an OS for driving the electronic apparatus 1 but also various applications, image data, appended data, etc. executable on the OS.

Specifically, the storage 65 may be configured to store a signal or data input/output corresponding to operations of the elements under control of the processor 66. The storage 65 may be configured to store a control program for controlling the electronic apparatus 1, an application provided by the manufacturer or downloaded from the outside, a relevant user interface (UI), images for providing the UI, user information, documents, databases, or the concerned data.

According to an embodiment of the disclosure, the term 'storage' is defined to include the storage 65, the ROM (not shown) in the processor 66, a RAM (not shown) or a memory card (not shown, e.g. a micro SD card, a memory stick, etc.) mountable to the electronic apparatus 1.

The processor 66 performs control for operating general elements of the electronic apparatus 1. The processor 66 may include a control program (or an instruction) to perform such a control operation, a nonvolatile memory in which the control program is installed, a volatile memory to which at least a part of the installed control program is loaded, and at least one of general-purpose processors such as a microprocessor, an application processor or a central processing unit (CPU) that executes the loaded control program.

The processor 66 may include a single-core processor, a dual-core processor, a triple-core processor, a quad-core processor, or the like multiple-core processor. The processor 66 may include a plurality of processors, for example, a main processor and a sub processor that operates in a sleep mode (e.g. when the display apparatus is supplied with only standby power and does not serve to display an image). Further, the processor, the ROM, and the RAM are connected to one another through an internal bus.

According to an embodiment, the processor 66 may be embodied as included in the main SoC mounted to the PCB internally provided in the electronic apparatus 1. According to another embodiment, the main SoC may further include the image processor 63 that processes an image signal.

The control program may include a program(s) achieved by at least one of a BIOS, a device driver, an OS, a firmware, a platform, or an application. According to an exemplary embodiment, the application program may be previously installed or stored in the electronic apparatus 1 when the electronic apparatus 1 is manufactured, or may be installed in the electronic apparatus 1 on the basis of application data received from the outside when it is required in the future. The application data may for example be downloaded from an external server such as an application market to the electronic apparatus 1. Such an external server is merely an example of the computer program product according to the disclosure, but not limited thereto.

According to an embodiment, the operation of the processor 66 may be embodied by a computer program stored in the computer program product (not shown) provided separately from the electronic apparatus 1. In this case, the computer program product includes a memory in which an instruction corresponding to a computer program is stored, and a processor.

Therefore, a display apparatus may download and execute a computer program stored in a separate computer program product, and perform the foregoing operations of the processor 66.

As described above, in an electronic apparatus according to an embodiment of the disclosure, a chip is provided with an off-chip inductor while maintaining functions of an equalizer that compensates a signal for distortion or attenuation in a process of transmitting the signal, thereby eliminating a waste of an IC die area and thus reducing a chip size.

Further, in an electronic apparatus according to an embodiment of the disclosure, IC design and system performance are optimized to be applicable to both a wire bonding type and a flip chip type in a chip packaging process, and facilitate tuning of inductance in an off-chip area.

Although a few exemplary embodiments have been shown and described, it will be appreciated that changes may be made in these exemplary embodiments without departing from the scope defined in the appended claims.

What is claimed is:

1. An electronic apparatus comprising:
   a substrate;
   an integrated circuit (IC) mountable on the substrate, the IC comprising:
      a subcircuit, and
      an equalizer configured to receive a channel input signal from an outside of the IC, compensate the received channel input signal for distortion or interference, and output the compensated channel input signal to the subcircuit; and
   an inductor mountable on the substrate and external to the IC, the inductor having:
      a first end connected to a power and a second end is-connected to a power supplying terminal of the equalizer, and
      an inductance corresponding to an operation frequency of the equalizer.

2. The electronic apparatus according to claim 1, wherein the second end of the inductor and the equalizer are connected by a bonding wire.

3. The electronic apparatus according to claim 2, wherein the inductance of the inductor is a first inductance and the bonding wire has a second inductance which correspond to the operation frequency of the equalizer, and the second inductance of the bonding wire depends on at least one of a length, a thickness, a height, an angle or material of the bonding wire.

4. The electronic apparatus according to claim 1, wherein the second end of the inductor and the equalizer are connected by a flip chip.

5. The electronic apparatus according to claim 1, further comprising a capacitor connected in parallel with the first end of the inductor with respect to the power,
   wherein the inductance of the inductor and a capacitance of the capacitor correspond to the operation frequency of the equalizer.

6. The electronic apparatus according to claim 1, wherein the subcircuit is at least one subcircuit of the IC and the subcircuit is connected to another power different from the power.

7. The electronic apparatus according to claim 1, wherein the equalizer is configured to amplify a signal of a frequency band corresponding to the operation frequency.

8. The electronic apparatus according to claim 1, wherein the equalizer comprises a continuous time linear equalizer (CTLE).

9. The electronic apparatus according to claim 1, wherein the channel input signal comprises a serial communication signal.

10. The electronic apparatus according to claim 9, wherein the serial communication signal comprises a signal based on at least one of a high definition multimedia interface (HDMI) or a universal serial bus (USB).

11. The electronic apparatus according to claim 1, wherein the inductor is a first inductor and the electronic apparatus further comprises:
   a second inductor of which a first end is connected to the power through the equalizer and a second end is connected to a ground.

12. The electronic apparatus according to claim 11, further comprising a display configured to display an image.

13. An electronic apparatus comprising:
a substrate; and
an integrated circuit (IC) mountable on the substrate, the IC comprising:
a subcircuit, and
an equalizer configured to receive a channel input signal from an outside of the IC, compensate the received channel input signal for distortion or interference, and output the compensated channel input signal to the subcircuit; and
an inductor mountable on the substrate and external to the IC, the inductor having:
a first end connected to a power through the equalizer and a second end connected to a ground, and
an inductance corresponding to an operation frequency of the equalizer.

14. The electronic apparatus according to claim 13, wherein
the first end of the inductor and the equalizer are connected by a bonding wire,
the inductance of the inductor is a first inductance and the bonding wire has a second inductance which correspond to the operation frequency of the equalizer, and
the second inductance of the bonding wire depends on at least one of a length, a thickness, a height, an angle or material of the bonding wire.

15. The electronic apparatus according to claim 13, wherein the first end of the inductor and the equalizer are connected by a flip chip.

16. The electronic apparatus according to claim 13, further comprising a capacitor connected with the second end of the inductor with respect to the ground,
wherein the inductance of the inductor and a capacitance of the capacitor correspond to the operation frequency of the equalizer.

17. The electronic apparatus according to claim 13, wherein the subcircuit is at least one subcircuit of the IC and the subcircuit is connected to another ground different from the ground.

18. The electronic apparatus according to claim 13, wherein the equalizer is configured to amplify a signal of a frequency band corresponding to the operation frequency.

19. The electronic apparatus according to claim 13, wherein the equalizer comprises a continuous time linear equalizer (CTLE).

20. The electronic apparatus according to claim 13, wherein the channel input signal comprises a serial communication signal based on at least one of a high definition multimedia interface (HDMI) or a universal serial bus (USB).

* * * * *